3,207,749
PROCESS FOR THE PRODUCTION OF DIHYDRO GLUCOSIDES
Klaus Repenning, Konstanz, Germany, assignor to Dr. Hommel's Chemische Werke und Handelsgesellschaft m.b.H., Am Hauptbahnhof, Millheim, Baden, Germany
No Drawing. Filed Apr. 19, 1962, Ser. No. 188,874
Claims priority, application Germany, Apr. 21, 1961, H 42,376
2 Claims. (Cl. 260—210.5)

The invention relates to a process for the manufacture of dihydro glucosides by hydrogenation of glucosides and, more particularly, to a process using a simple catalyst and yielding pure end products.

The dihydro compounds of heart-active glucosides are of pharmacological interest because their therapeutic breadth is more far-reaching than that of the starting products, and the desired effect takes place at a considerably faster speed. The dihydro glucosides hitherto disclosed have been prepared by the hydrogenation of the glucosides in aqueous or aqueous-alcoholic solution, using colloidal palladium as a catalyst (Walter A. Jacobs and Alexander Hoffmann, J. Biol. Chem. 74 (1927), 787; Robert L. Vick, J. B. Kahn and George Acheson, J. Pharmacol. Exper. Therap. 1957, 330ff).

The products thus obtained, however, are not of sufficient purity to be used for therapeutical purposes since they still are contaminated by up to 5 percent of the starting material so that the melting points given do not correspond to the chemically pure compounds.

According to the instant invention, the desired substances, i.e., dihydro glucosides, are not only obtained in pure form but it also is feasible to avoid the use of expensive noble metal catalysts. This is accomplished by hydrogenating the glucosides in the presence of Raney nickel as catalyst and by continuing the contact of the solution with hydrogen in the presence of that catalyst for at least 24 hours beyond the time at which a measurable hydrogen acceptance of the reaction product had terminated. It has been established that the substances thus obtained contain less than 0.5 percent starting material. This had been determined by analyzing the reaction of the unsaturated compound spectrophotometrically with alkaline dinitrobenzoic acid solution (red coloration). The saturated compounds do not exhibit such coloration with that reagent.

It furthermore has been established that the melting point of pure dihydro digitoxine is 225° C., whereas Jacobs and Hoffmann (l.c.) name a melting point of 202–204° C. The melting point of pure dihydro digoxine was determined as 163° C., that of pure dihydro ouabaine as 168–170° C.

The absence of the starting material in the dihydro compounds is an absolute requirement for their therapeutical employment because the starting materials are more effective by approximately one power of ten than the hydrogenated substances so that even slight decontamination may lead to harmful over-dosages. For the same reason, i.e., because of their slight therapeutic breadth, the use of the starting materials is dangerous.

Albeit Raney nickel is a well-known hydrogenation catalyst, it could not be expected that it could replace noble metal catalysts in the instance at hand since difficulties based on steric hindrances frequently occur with difficultly constructed molecules, such as glucosides. It therefore had always been considered necessary to employ noble metal catalysts.

The invention now will be further illustrated by the following example. However, it should be understood that this is given merely by way of explanation, not of limitation, and that numerous changes may be made in the details without departing from the spirit and the scope of the invention as hereinafter claimed.

*Example*

10 g. digoxine were dissolved in 750 ml. methanol and 100 ml. water. 2 g. Raney nickel were added thereto, and hydrogenation carried out. The hydrogenation was continued for 24 hours after the macroscopically determinable hydrogen acceptance of the glucoside had terminated. The catalyst then was filtered, the filtrate evaporated to remove solvent and then dried in vacuo. The substance obtained, i.e., dihydrodigoxine, had a melting point of 163° C., the yield was 8.5 g.

What is claimed is:
1. A process for the production of dihydro digoxine by hydrogenation of digoxine, which comprises hydrogenating in the presence of Raney nickel and continuing the contact of the reaction product with hydrogen, in the presence of the catalyst, for 24 hours after the measurable hydrogen acceptance of the digoxine had ceased.
2. A process for the production of dihydrodigoxine having a purity of substantially 99.5 percent and a melting point of 163° C., which comprises hydrogenating digoxine in the presence of Raney nickel and continuing the contact of the reaction product with hydrogen for approximately 24 hours after measurable hydrogen acceptance of digoxine had ceased.

References Cited by the Examiner

Fieser & Fieser: Steroids, Reinhold Pub. Corp., New York (1959), pages 112, 260, 261 and 667.
J. Biol. Chem., vol. 74, No. 3, by Jacobs et al., pages 787 to 793 (1927).
Turner: "Chem. Reviews," vol. 43, August 1948, pp. 20–42.
Vick et al.: "Chem. Abst.," vol. 52, 1958, p. 4008e.

LEWIS GOTTS, *Primary Examiner.*